April 8, 1958  J. A. HERRMANN ET AL  2,830,136
TROLLEY DUCT AND COLLECTOR THEREFOR
Original Filed July 1, 1950

INVENTORS
John A. Herrmann
Elwood T. Platz
BY
S. Eugene Bychinsky
THEIR ATTORNEY.

United States Patent Office 2,830,136
Patented Apr. 8, 1958

2,830,136

TROLLEY DUCT AND COLLECTOR THEREFOR

John A. Herrmann, Grosse Pointe Farms, and Elwood T. Platz, Detroit, Mich., assignors, by mesne assignments, to I-T-E Circuit Breaker Company, Philadelphia, Pa., a corporation of Pennsylvania Original application July 1, 1950, Serial No. 171,588, now Patent No. 2,696,532, dated December 7, 1954. Divided and this application August 24, 1954, Serial No. 451,882

1 Claim. (Cl. 191—23)

This invention relates to electrical distribution systems of the trolley duct type, and particularly to novel trolleys useful in such systems. This application is a division of pending application No. 171,588, filed July 1, 1950, now patent No. 2,696,532.

A principal object of the present invention is to provide a novel type of trolley arranged to provide a high degree of smoothness of movement along the duct and also arranged to be separable so as to be readily applicable to, or removable from, a duct at any point thereof.

A further object is to provide a novel form of trolley useful particularly with a duct of the open channel type with the trolley having sides and a bottom which completely shield the trolley contacts at their points of engagement with the bus bars.

Generally, the trolley herein described comprises a bottom plate and side plates with the latter having rollers for riding on the upper surface of the channel duct. The lower or bottom surface of the trolley is formed with upwardly projecting contactors or collectors which engage the undersurfaces of bus bars that may be mounted in the channel duct and exposed to the open bottom of the duct. The bottom wall of the trolley may be formed with upwardly extending end portions to complete the enclosure of the space under the duct encompassed by the trolley so that the collectors and contactors within the trolley are completely shielded from outside the trolley. A more complete description of a duct configuration that is particularly suitable for use with the trolley of the instant invention may be had by reference to patent application Serial No. 164,247, filed on May 25, 1950, and assigned to the assignee of the present invention. This application is now Patent No. 2,675,434.

Details of construction of the trolley herein disclosed will best be understood upon reference to the appended drawings, wherein.

Figure 2:
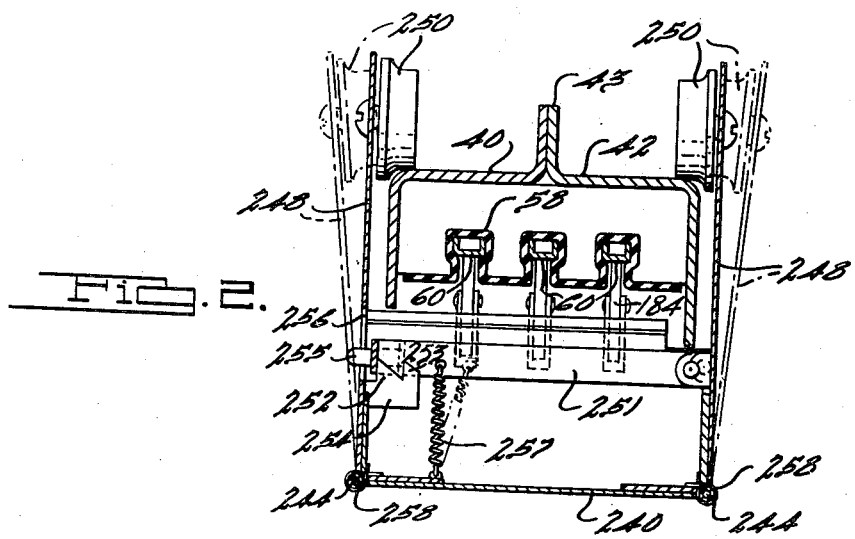
Fig. 2 is an end elevational view of the trolley collector of Fig. 1 with the end wall cut away.

A trolley duct, more fully described in the aforementioned copending application which is now Patent No. 2,675,434, may include a casing made up of two halves 40—42 (Fig. 2). Each is of "ogee" form and has a central flange 43. Meeting flanges 43 may be riveted together by rivets 44 passed through rivet holes, some of which holes may be utilized to receive bolts or other fastening means enabling the duct to be connected to vertical hangers (not shown).

Running from end to end of each unit length is an insulation liner 58 of thin, flexible insulation material rigid enough to be shape-sustaining and self-supporting but flexible enough to be bent on longitudinal edges of its ridges to permit U-shaped bus bars 60 of the form shown in Fig. 2 to be held by shoulders of the insulation liner 58.

For use with the open bottom channel type trolley duct briefly described, there is provided a trolley comprising a base or bottom plate 240 formed with end walls 242. To the longitudinal side edges of the base 240 are hingedly secured by hinges 244, side plates 248 having trolley engaging rollers 250. One side plate 248 is formed with a bail 251 which hooks over either of two hook portions 252—253 of lugs 254 secured to the other side plate 248, and the bail 251 has a knob 255 projecting through an opening 256 of the side plate 248. A spring 257 normally coerces the bail 251 in a downward direction to cause it to engage behind hooks 252 or 253 to maintain the side plates as close to each other as possible. However, the knob 255 may be moved upwardly, manually, in slot 256 of side plate 248 to lift the bail 251 from hooks 252 and thus free the side plates to be moved away from each other by the springs 258 around hinges 244.

Figure 1:
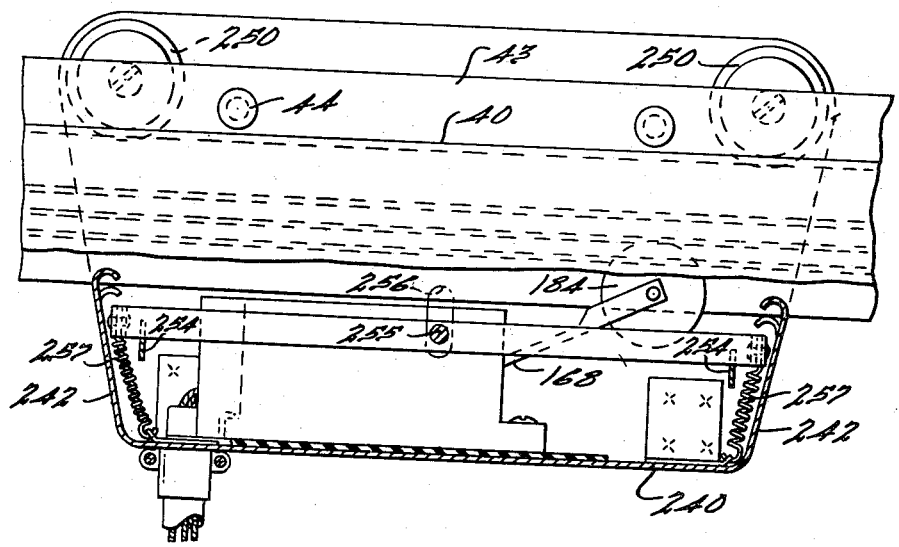
Fig. 1 is a side elevational view showing one embodiment of trolley collector for the duct.

Mounted upon base 240 (Fig. 1) is a fuse and connection block, more fully described in application No. 171,588, now U. S. Patent 2,696,532, hereinabove referred to.

Straps 168 are connected to contactors 184 (Fig. 1), which may be in the form of rollers as illustrated, or any other form, such as contactor bars or shoes, which contactors move along the undersurfaces of the bus bars 60 of the trolley duct and thus electrically engage the bus bars.

It will be observed that the trolley herein described is designed especially for use with the open channel type of duct here disclosed and is formed to ride freely on the horizontal upper surface of such channel with the collectors projecting upwardly from the bottom of the trolley to the bus bars through the open bottom of the channel. The bottom plates of the trolley, together with the side plates and end plates, forms a complete and effective shield around the collectors of the trolley and with the points of contact of such collectors with the duct bus bars.

We claim:

For use with a trolley duct comprising an open bottom channel casing of inverted U form and having bus bars or rails under the casing and exposed on their own undersurfaces, a trolley type collector having a bottom plate, two side plates movably connected thereto at their lower portions and having supporting rollers on and inside their upper portions for rolling on the top wall of the casing, bus bar contactors operatively mounted to the bottom plate and projecting upwardly to engage the bus bars or rails, disengageable locking means comprising a latch pivotally secured to one such side plate and a lug secured to the other side plate, said latch releasably engaging the lug to maintain said rollers in interlocked position over the top of said duct, a first spring means urging said side plates simultaneously to move away from each other when said latch is disengaged thereby releasing said trolley collector from said duct, a second spring means urging said latch to move downward, said lug having means for slidably returning said latch into hooked engagement with said lug whereby said side plates of said collector are maintained in operative condition and said rollers are interlocked over the top of said duct; said disengageable locking means and said second spring means being operatively positioned on the inside of said trolley collector, a knob secured to said latch for releasing said locking means, said knob being operatively positioned to extend through an opening in said other side plate when said locking means is engaged.

References Cited in the file of this patent

UNITED STATES PATENTS

| Re. 19,513 | Frank et al. | Apr. 2, 1935 |
| 1,392,615 | Anthony | Oct. 4, 1921 |
| 1,583,744 | Pollard | May 4, 1926 |
| 1,897,362 | Daniels | Feb. 14, 1933 |
| 2,578,368 | Nehrke | Dec. 11, 1951 |